US012186256B1

(12) United States Patent
Zhong et al.

(10) Patent No.: US 12,186,256 B1
(45) Date of Patent: Jan. 7, 2025

(54) MASSAGER

(71) Applicant: Guangzhou Tiankang Limei Electronic Technology Co., Ltd., Guangzhou (CN)

(72) Inventors: Lei Zhong, Beijing (CN); Hao Chen, Guangzhou (CN); Xiangteng Jiang, Jiujiang (CN); Xiaoting Lan, Yizhou (CN)

(73) Assignee: Guangzhou Tiankang Limei Electronic Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/745,339

(22) Filed: Jun. 17, 2024

(51) Int. Cl.
*A61H 19/00* (2006.01)

(52) U.S. Cl.
CPC ..... *A61H 19/44* (2013.01); *A61H 2201/1215* (2013.01); *A61H 2201/1664* (2013.01)

(58) Field of Classification Search
CPC ............ A61H 19/44; A61H 2201/1215; A61H 2201/1664; A61H 23/0254; A61H 21/00; A61H 19/00; A61H 2201/149; A61H 9/005; A61H 9/0078
See application file for complete search history.

(56) References Cited

U.S. PATENT DOCUMENTS

| | | | | |
|---|---|---|---|---|
| 2003/0073881 A1* | 4/2003 | Levy | ...................... | A61H 19/40 600/38 |
| 2008/0194907 A1* | 8/2008 | Lin | ........................ | A61H 19/44 600/38 |
| 2017/0281459 A1* | 10/2017 | Cirillo-Schmidt | ..... | A61H 23/02 |

FOREIGN PATENT DOCUMENTS

| | | |
|---|---|---|
| CN | 204814751 U | 12/2015 |
| CN | 206660098 U | 11/2017 |
| CN | 111904825 A | 11/2020 |

* cited by examiner

*Primary Examiner* — Kendra D Carter
*Assistant Examiner* — Arielle Wolff

(57) ABSTRACT

This application provides a massager including a shell, where the shell includes a first body, a second body, and a silicone sleeve, the first body and the second body are inserted along a length direction of the shell, and the silicone sleeve sleeves the first body and the second body; a jacking assembly configured to extend and retract to drive the second body to move relative to the first body along the length direction of the shell; and an expansion assembly configured to expand so as to enlarge a diameter of the silicone sleeve outside the second body. In this application, the jacking assembly and the expansion assembly are used to increase the length and diameter of the massager.

15 Claims, 6 Drawing Sheets

MASSAGER

TECHNICAL FIELD

This application relates to the field of health technologies, and in particular to a massager.

BACKGROUND

With the development of various industries in society, workplace stress is increasing. To alleviate workplace stress, various types of massagers have emerged.

Women in the workplace always use various sex toys during leisure time to satisfy their physiological needs and relieve stress. Due to the difference in physiological structure sizes among women, they often choose sex toys based on their own sizes.

When a woman has multiple different demands for sex toy, such as different requirements for length and diameter, she usually needs to purchase multiple different sex toys to meet her own demands. This leads to the issue that a single sex toy cannot satisfy the varying demands of a woman.

SUMMARY

In view of this, it is necessary to provide a massager, highly applicable, that can satisfy different sex requirements of a woman, thus resolving the foregoing problem.

The embodiments of this application provide a massager, including:

- a shell, including a first body, a second body, and a silicone sleeve, where the first body and the second body are inserted along a length direction of the shell, and the silicone sleeve sleeves the first body and the second body;
- a jacking assembly having one end fixed in an inner cavity of the first body and the other end fixed in an inner cavity of the second body and configured to extend and retract to drive the second body to move relative to the first body along the length direction of the shell; and
- an expansion assembly sleeved between the second body and the silicone sleeve and configured to expand so as to enlarge a diameter of the silicone sleeve outside the second body.

In at least one embodiment of this application, the jacking assembly includes a telescopic motor and a connector.

The telescopic motor is fixed in the inner cavity of the first body and the connector has one end fixed in the inner cavity of the second body and the other end fixed on a drive shaft of the telescopic motor.

In at least one embodiment of this application, the second body includes a first abutting portion, a sliding portion, and a second abutting portion that are sequentially connected.

The first body is provided with a first inner cavity and a first opening in communication with the first inner cavity.

The first abutting portion is provided with a fixing hole, the connector is fixed in the fixing hole, part of the sliding portion protrudes into the first opening, and the second abutting portion is disposed at an end of the sliding portion away from the first abutting portion.

In at least one embodiment of this application, a cross-sectional area of the first abutting portion is greater than a cross-sectional area of the first opening, a cross-sectional area of the second abutting portion is greater than the cross-sectional area of the first opening, and a cross-sectional area of the sliding portion is less than or equal to the cross-sectional area of the first opening.

In at least one embodiment of this application, the connector includes a first connecting portion and a second connecting portion that are connected sequentially.

The first connecting portion is fixed in the fixing hole, and the second connecting portion protrudes into and is fixed in an inner cavity of the sliding portion.

In at least one embodiment of this application, the second body further includes a support portion disposed on the second abutting portion, and the support portion is provided with an accommodating groove provided in its outer peripheral wall.

The expansion assembly includes a fixing member and an expansion member, the fixing member is sleeved in the accommodating groove, and the expansion member sleeves the fixing member and is configured to expand, when the massager protrudes into a human body, to increase a diameter of the silicone sleeve at the second body.

In at least one embodiment of this application, the fixing member includes a main body portion, a first sealing portion, a second sealing portion, and an air guide portion.

The main body portion is provided with a through groove along its length direction, and the support portion is inserted into the through groove.

The first sealing portion and the second sealing portion are respectively disposed at two ends of the main body portion, the expansion member surrounds the main body portion and has two ends sealingly abutting against the first sealing portion and the second sealing portion, respectively, and the expansion member, the main body portion, the first sealing portion, and the second sealing portion enclose an expansion space.

The main body portion is provided with an air inlet in communication with the through groove and the expansion space, and the air guide portion is disposed at the through groove and communicates with the air inlet.

In at least one embodiment of this application, the air guide portion includes an air inlet pipe, an air outlet pipe, and an air pressure detection pipe that are in communication with the expansion space, and the massager further includes an air pump, a first electron magnetic valve, and a first air pressure sensor.

The air pump is disposed in an inner cavity of the support portion, communicates with the air inlet pipe, and is configured to inflate the expansion space via the air inlet pipe and the air inlet.

The first electron magnetic valve is disposed in the inner cavity of the support portion, communicates with the air outlet pipe, and is configured to control the air outlet pipe for air exhaust.

The first air pressure sensor is disposed on the support portion, communicates with the air pressure detection pipe, and is electrically connected to the first electron magnetic valve and configured to detect air pressure in the expansion space and control the first electron magnetic valve for air exhaust.

In at least one embodiment of this application, the massager further includes a second air pressure sensor and a second electron magnetic valve.

The second air pressure sensor is disposed in the inner cavity of the first body and/or the second body, electrically connected to the second electron magnetic valve, and configured to detect air pressure of an inner cavity of the silicone sleeve.

The second electron magnetic valve is disposed in the first body and extends out of the first body and the silicone sleeve to communicate with the outside for air intake or exhaust.

In at least one embodiment of this application, the first sealing portion and the second sealing portion wrap an outer wall of the expansion member.

According to the massager described above, the shell includes a first body and a second body, which are inserted along the length direction of the shell, such that the jacking assembly extends and retracts to drive the second body to move relative to the first body along the length direction of the shell, thus increasing the length of the massager. The expansion assembly expands to enlarge the diameter of the silicone sleeve outside the second body, so as to increase the diameter of the massager, such that the massager is suitable for people with different structures.

NUMERAL REFERENCES OF MAIN ELEMENTS

100. massager; 10. shell; 11. first body; 11*a*. first inner cavity; 11*b*. first opening; 12. second body; 121. first abutting portion; 121*a*. fixing hole; 122. sliding portion; 123. second abutting portion; 13. silicone sleeve; 14. support portion; 14*a*. accommodating groove; 20. jacking assembly; 21. telescopic motor; 22. connector; 221. first connecting portion; 222. second connecting portion; 30. expansion assembly; 31. fixing member; 311. main body portion; 311*a*. through groove; 312*a*. air inlet; 31*a*. expansion space; 312. first sealing portion; 313. second sealing portion; 314. air guide portion; 3141. air inlet pipe; 3142. air outlet pipe; 3143. air pressure detection pipe; 32. expansion member; 40. air pump; 50. first electron magnetic valve; 60. first air pressure sensor; and 70. second electron magnetic valve.

DETAILED DESCRIPTION OF THE EMBODIMENTS

The embodiments of this application are described below with reference to the drawings in the embodiments of this application, and obviously the described embodiments are merely some rather than all of the embodiments of this application.

It should be noted that when an assembly is "connected" to another assembly, it may be connected to the another assembly directly or via an intermediate assembly. When an assembly is "disposed" on another assembly, it may be disposed on the another assembly directly or via an intermediate assembly. The terms "top", "bottom", "up", "down", "left", "right", "front", and "back" and similar expressions used in this specification are solely for explanatory purposes and do not indicate the only implementation.

The embodiments of this application are described in detail below with reference to the drawings. In absence of conflicts, the following embodiments and features in the embodiments may be combined.

Figure 1:
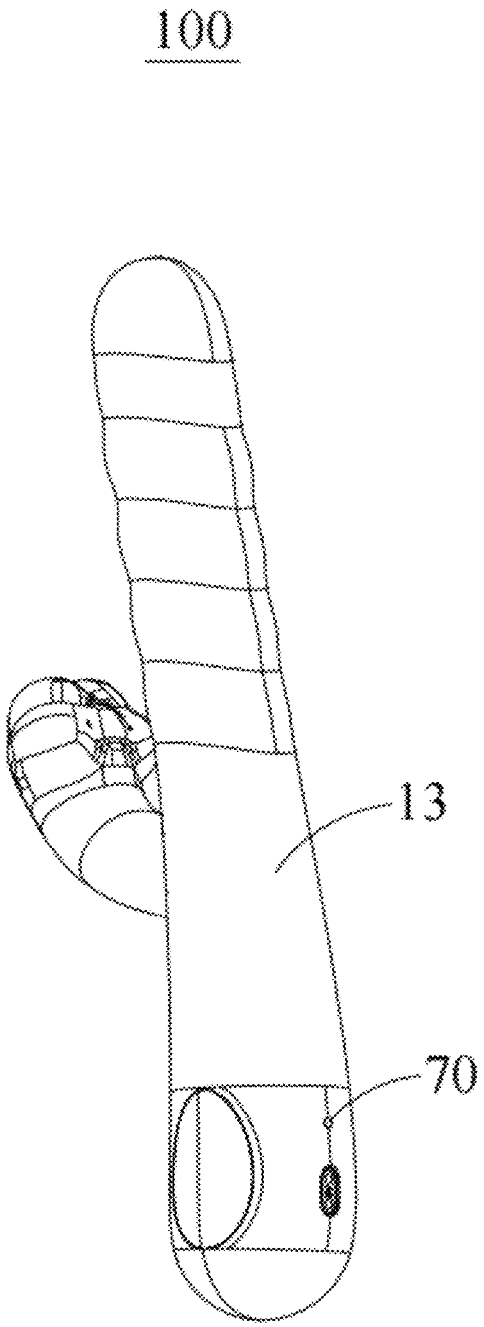
FIG. 1 is a schematic diagram of a three-dimensional structure of a massager according to an embodiment of this application.
Figure 2:
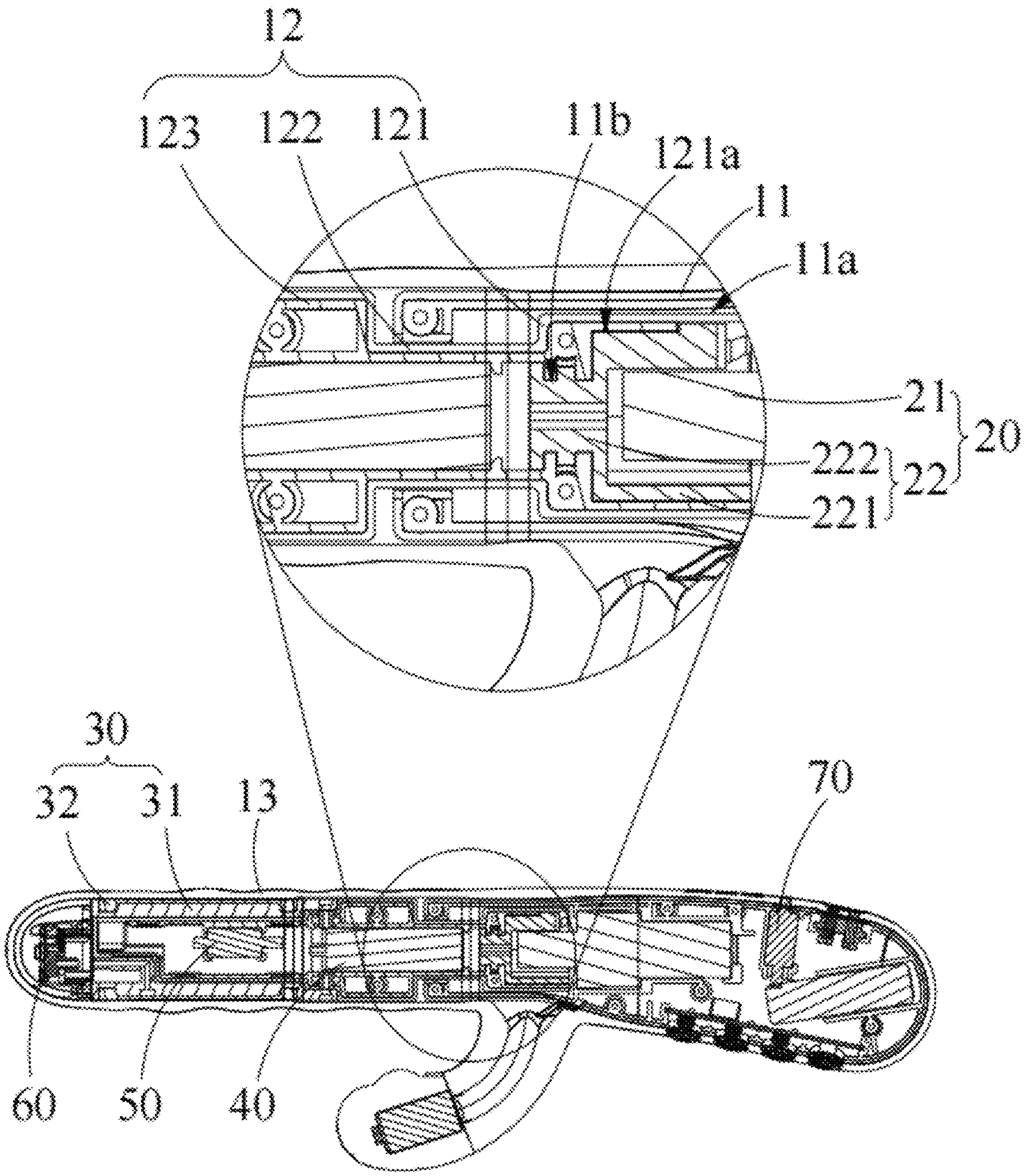
FIG. 2 is a cross-sectional view of the massager in FIG. 1.
Figure 3:
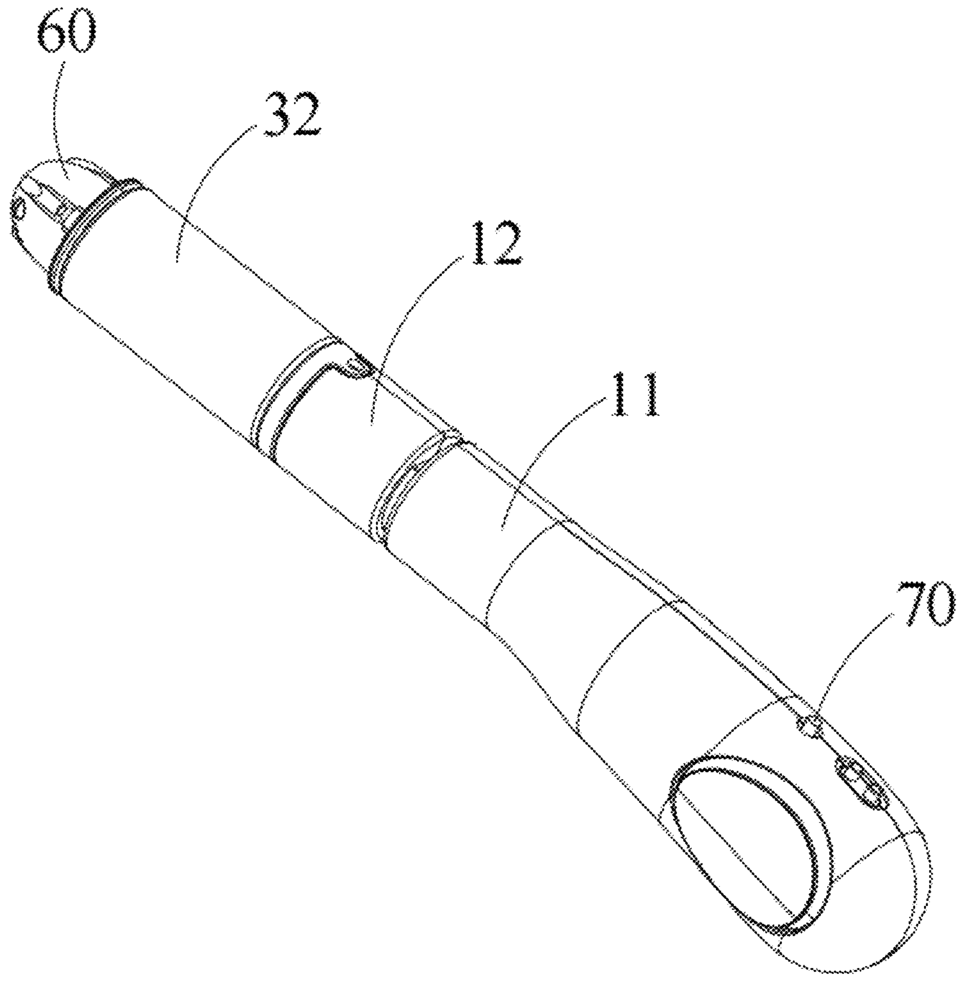
FIG. 3 is a schematic diagram of a three-dimensional structure of the massager without a silicone sleeve in FIG. 1.
Figure 4:
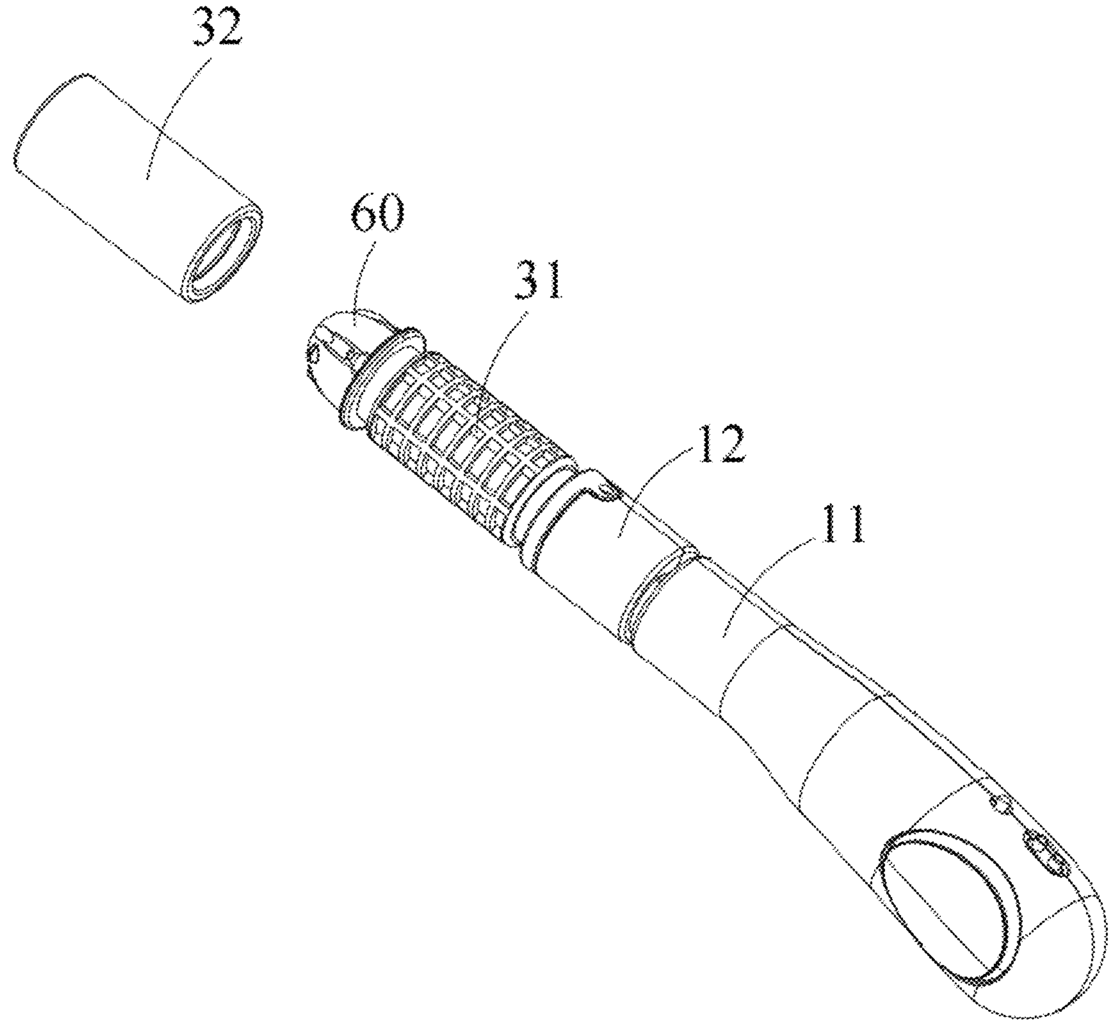
FIG. 4 is an exploded view of the massager being in a first state in FIG. 3.
Figure 5:
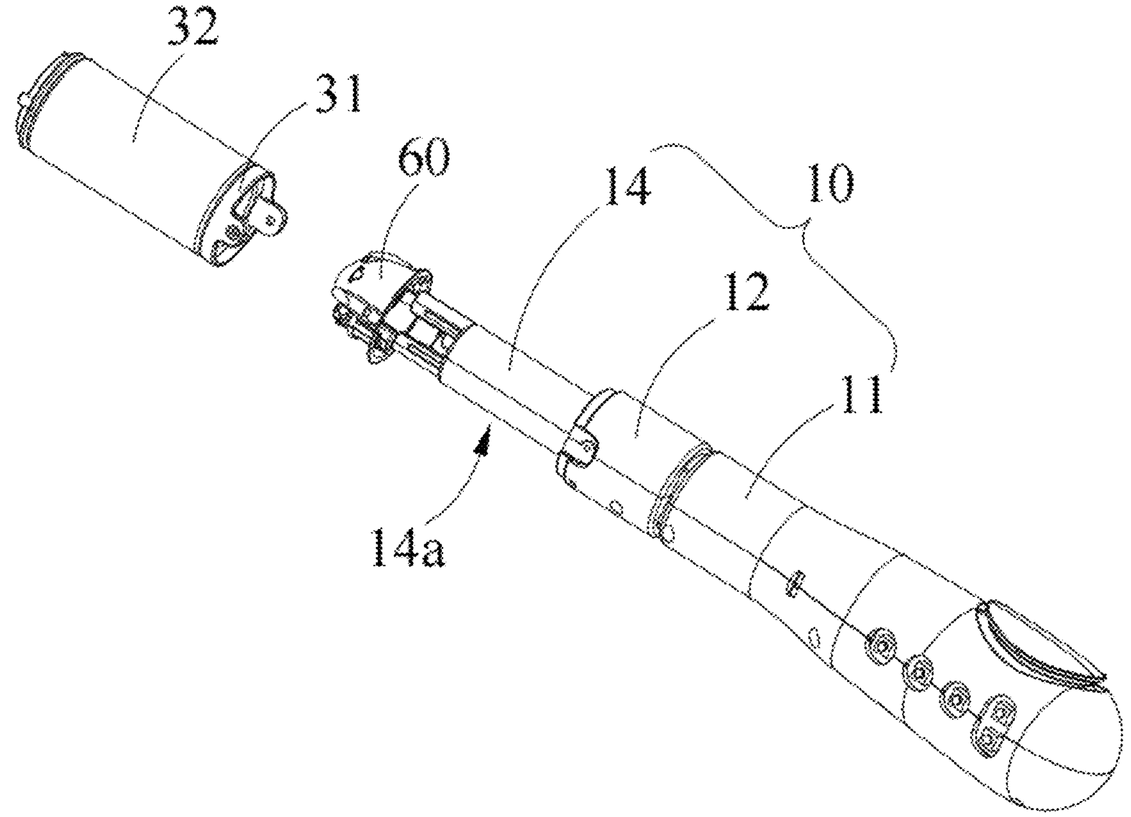
FIG. 5 is an exploded view of the massager being in a second state in FIG. 3.
Figure 6:
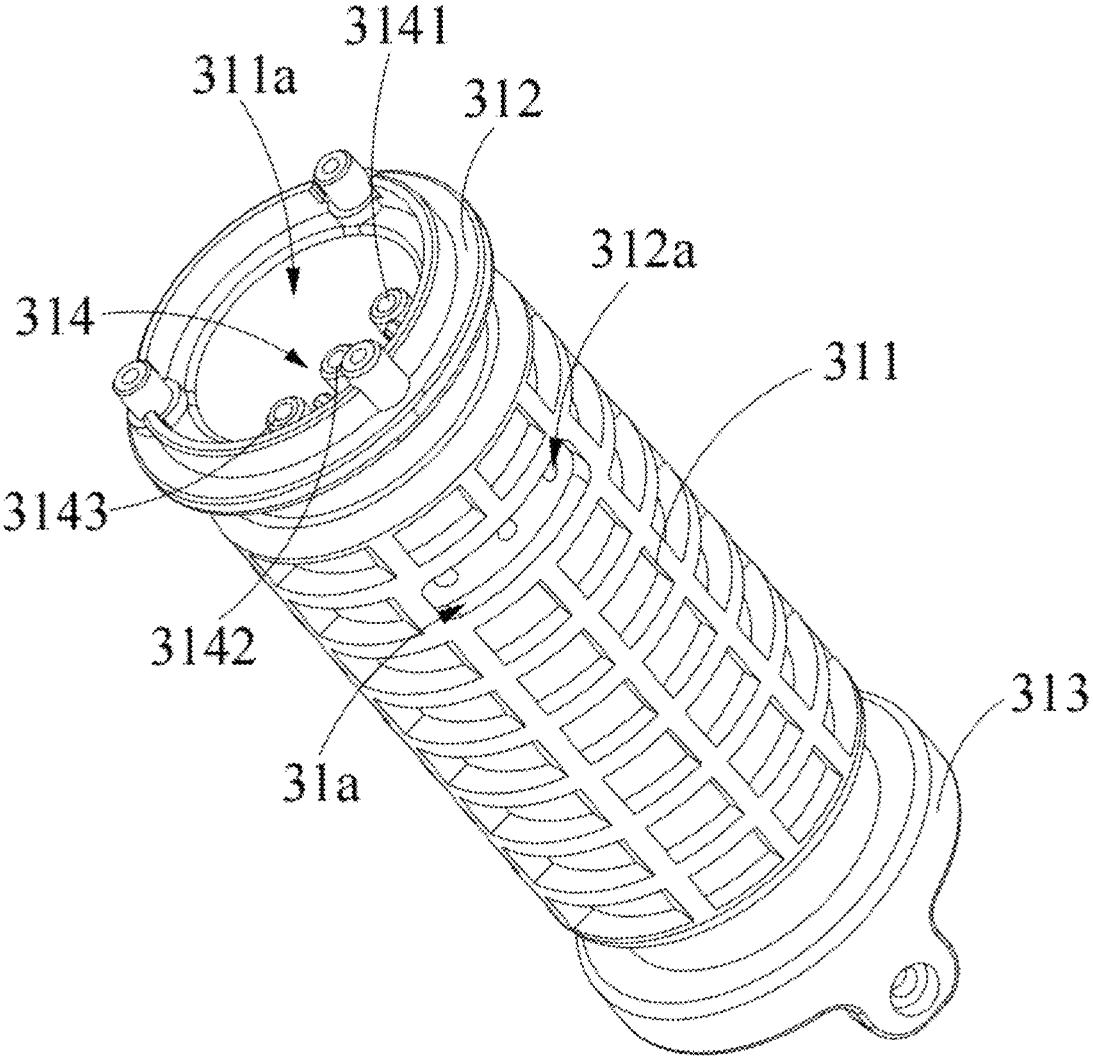
FIG. 6 is a schematic diagram of a three-dimensional structure of a fixing member of the massager in FIG. 1.

Referring to FIGS. 1 to 6, this application provides a massager 100, including: a shell 10, including a first body 11, a second body 12, and a silicone sleeve 13, where the first body 11 and the second body 12 are inserted along a length direction of the shell 10, and the silicone sleeve 13 sleeves the first body 11 and the second body 12; a jacking assembly 20 having one end fixed in an inner cavity of the first body 11 and the other end fixed in an inner cavity of the second body 12 and configured to extend and retract to drive the second body 12 to move relative to the first body 11 along the length direction of the shell 10; and an expansion assembly 30 sleeved between the second body 12 and the silicone sleeve 13 and configured to expand so as to enlarge a diameter of the silicone sleeve 13 outside the second body 12.

According to the massager 100 described above, the shell 10 includes the first body 11 and a second body 12, which are inserted along the length direction of the shell 10, such that the jacking assembly 20 extends and retracts to drive the second body 12 to move relative to the first body 11 along the length direction of the shell 10, thus increasing the length of the massager 100. The expansion assembly 30 expands to enlarge the diameter of the silicone sleeve 13 outside the second body 12, so as to increase the diameter of the massager 100, such that the massager is suitable for people with different structures.

It should be noted that the silicone sleeve 13 sealingly sleeves the first body 11 and the second body 12, and when the jacking assembly 20 extends and retracts to drive the second body 12 to move relative to the first body 11 along the length direction of the shell 10, the overall length of the shell 10 increases, so as to be suitable for different women.

Further, when the jacking assembly 20 drives the second body 12 to move along the length direction of the shell 10, the second body 12 squeezes the silicone sleeve 13, causing it to deform. Because the silicone sleeve 13 is elastic and soft, when the second body 12 moves relative to the first body 11, lengthening the shell 10, and the second body 12 protrudes into a woman body, the silicone sleeve 13 comes into contact with the women's skin and does not break during the deformation, thus preventing the massager 100 from breaking in human body after protruding into it or the silicone sleeve 13 from being damaged, which otherwise causes damage to the human body.

In a specific embodiment, the first body 11 and the second body 12 are both roughly elongated columnar structures so that they can be interlocked, allowing relative movement under the driving of the jacking assembly 20.

To help to push the second body 12 to move relative to the first body 11, in a specific embodiment, the jacking assembly 20 includes a telescopic motor 21 and a connector 22. The telescopic motor 21 is fixed in the inner cavity of the first body 11 and the connector 22 has one end fixed in the inner cavity of the second body 12 and the other end fixed on a drive shaft of the telescopic motor 21.

In a specific implement, the telescopic motor 21 is roughly a rectangular structure, which is clamped in the inner cavity of the first body 11 via a snap or buckle structure. In this application, the connector 22 has one end fixed in the inner cavity of the second body 12 and the other end fixed on the telescopic motor 21, and the telescopic motor 21 drives the connector 22 to push the second body 12 to move relative to the first body 11 along its length direction, thus changing its length. Preferably, the connector 22 is buckled or clamped in the inner cavity of the second body 12.

Specifically, to enable better connection between the first body 11 and the second body 12, in a specific embodiment, the second body 12 includes a first abutting portion 121, a sliding portion 122, and a second abutting portion 123 that are connected sequentially. The first body 11 is provided with a first inner cavity 11*a* and a first opening 11*b* in communication with the first inner cavity 11*a*; and the first abutting portion 121 is provided with a fixing hole 121*a*, the connector 22 is fixed in the fixing hole 121*a*, part of the sliding portion 122 protrudes into the first opening 11*b*, and the second abutting portion 123 is disposed at an end of the sliding portion 122 away from the first abutting portion 121.

In a specific embodiment, the first abutting portion 121, the sliding portion 122, and the second abutting portion 123 are formed integrally. Preferably, the first abutting portion 121, the sliding portion 122, and the second abutting portion 123 are made of hard plastics and formed through hot pressing.

In a specific embodiment, the connector 22 is fixed in the fixing hole 121*a* using a glue. Preferably, the sliding portion 122 is clamped in the first opening 11*b*, the first abutting portion 121 is located in the first inner cavity 11*a*, and the second abutting portion 123 is located outside the first opening 11*b*, that is, the second abutting portion 123 is located outside the first body 11. When the length of the massager needs to be adjusted, the telescopic motor 21 is started. The telescopic motor 21 extends out of its drive shaft to be against the first abutting portion 121. In this case, the sliding portion 122 moves outward from the first opening 11*b*, increasing the length of the sliding portion 122 extending out of the first opening 11*b*, such that based on the length of the first body 11 and the length of the second body 12 extending out of the first opening 11*b*, the overall length of the massager 100 is increased from a perspective of an external shape. Thus, when a different woman needs a massager 100 with a different length, the telescopic motor 21 can be used to adjust the overall length of the massager 100, thus enhancing its applicability.

To increase the overall length of the massager 100 and prevent the first body 11 from detaching from the second body 12 and damaging the massager 100, in a specific embodiment, a cross-sectional area of the first abutting portion 121 is greater than a cross-sectional area of the first opening 11*b*, a cross-sectional area of the second abutting portion 123 is greater than the cross-sectional area of the first opening 11*b*, and a cross-sectional area of the sliding portion 122 is less than or equal to the cross-sectional area of the first opening 11*b*.

It should be noted that in the foregoing solution, the cross-sectional areas of the first abutting portion 121 and the second abutting portion 123 are both greater than the cross-sectional area of the first opening 11*b*, and the cross-sectional area of the sliding portion 122 is less than or equal to the cross-sectional area of the first opening 11*b*. In other words, the second body 12 is clamped in the first opening 11*b* at the sliding portion 122, the first abutting portion 121 and the second abutting portion 123 are respectively blocked inside and outside the first opening 11*b*, such that the second body 12 is clamped in the first opening 11*b*, avoiding, when the second body 12 moves relative to the first body 11, that a long movement distance causes the second body 12 to detach from the first body 11.

Further, in a process of increasing the length of the massager 100, to enable the telescopic motor 21 to better drive the second body 12 to move via the connector 22, in a specific embodiment, the connector 22 includes a first connecting portion 221 and the second connecting portion 222 that are arranged sequentially. The first connecting portion 221 is fixed in the fixing hole 121*a*, and the second connecting portion 222 protrudes into and is fixed in the inner cavity of the sliding portion 122.

In a specific embodiment, the first connecting portion 221 is fixed in the fixing hole 121*a* via a glue or buckle, and the second connecting portion 222 is fixed in the inner cavity of the sliding portion 122 via a glue or buckle.

In a specific embodiment, the first connecting portion 221 and the second connecting portion 222 are integrally formed, the first connecting portion 221 fits with the inner cavity of the fixing hole 121*a* as for shape and size or is smaller than the inner cavity of the fixing hole 121*a*, and the second connecting portion 222 fits with the inner cavity of the sliding portion 122 as for shape and size or is smaller than the inner cavity of the sliding portion 122.

In a specific embodiment, to facilitate mounting of the expansion member 32, the second body 12 further includes a support portion 14 on the second abutting portion 123, and the support portion 14 is provided with an accommodating groove 14*a* on its outer peripheral wall. The expansion assembly 30 includes a fixing member 31 and an expansion member 32.

The fixing member 31 is sleeved in the accommodating groove 14*a*, and the expansion member 32 sleeves the fixing member 31 and is configured to expand, when the massager 100 protrudes into a human body, to increase a diameter of the silicone sleeve 13 at the second body 12.

In the foregoing manner, the fixing member 31 is fixed using a groove, and the expansion member 32 sleeving the fixing member 31 can enhance the stability in fixing the expansion member 32.

In a specific embodiment, the support portion 14 is roughly an elongated columnar structure, and the fixing member 31 is an annular structure sleeving a cylinder on the support portion 14.

In a specific embodiment, the expansion member 32 is a silicone airbag.

To better fix the expansion member 32 and enable the expansion member 32 to expand, so as to increase the diameter of the massager 100, thus increasing the applicability of the massager 100, in a specific embodiment, the fixing member 31 includes a main body portion 311, a first sealing portion 312, a second sealing portion 313, and an air guide portion 314. The main body portion 311 is provided with a through groove 311*a* along its length direction, and the support portion 14 is inserted into the through groove 311*a*. The first sealing portion 312 and the second sealing portion 313 are respectively disposed at two ends of the main body portion 311, the expansion member 32 surrounds the main body portion 311 and has two ends sealingly abutting against the first sealing portion 312 and the second sealing portion 313, respectively, and the expansion member 32, the main body portion 311, the first sealing portion 312, and the second sealing portion 313 enclose an expansion space 31*a*. The main body portion 311 is provided with an air inlet 312*a* in communication with the through groove 311*a* and the expansion space 31*a*, and the air guide portion 314 is disposed at the through groove 311*a* and communicates with the air inlet 312*a*.

In a specific embodiment, the main body portion 311, the first sealing portion 312, the second sealing portion 313, and the air guide portion 314 are integrally formed.

It should be noted that in this application, the first sealing portion 312 and the second sealing portion 313 respectively abut against two ends of the expansion member 32 and block openings at two ends of the expansion member 32, to achieve a sealing effect. Preferably, the diameter of the main body portion 311 is less than the diameters of the first sealing portion 312 and the second sealing portion 313, such that when the expansion member 32 surrounds the main body portion 311, a gap is present between the expansion member and the main body portion 311, that is, the foregoing expansion space 31*a*.

Further, in this application, an air inlet 312*a* is provided in the main body portion and the air guide portion 314 is disposed at the through groove 311*a* and communicates with the air inlet 312*a*, such that when the massager needs to become thicker, air is pumped through the air guide portion 314 via the air inlet 312*a*, allowing the air to enter the expansion space 31*a* via the air inlet 312*a*. And because the expansion space 31*a* is sealed, after the air volume reaches a certain amount, it expands the expansion member 32, enlarging the expansion member 32, thus increasing its diameter.

To facilitate an increase or a decrease in the diameter of the massager 100, in a specific embodiment, the air guide portion 314 includes an air inlet pipe 3141, an air outlet pipe 3142, and an air pressure detection pipe 3143 that are in communication with the expansion space 31*a*, and the massager 100 further includes an air pump 40, a first electron magnetic valve 50, and a first air pressure sensor 60. The air pump 40 is disposed in an inner cavity of the support portion 14, communicates with the air inlet pipe 3141, and is configured to inflate the expansion space 31*a* via the air inlet pipe 3141 and the air inlet 312*a*. The first electron magnetic valve 50 is disposed in the inner cavity of the support portion 14, communicates with the air outlet pipe 3142, and is configured to control the air outlet pipe 3142 for air exhaust. The first air pressure sensor 60 is disposed on the support portion 14, communicates with the air pressure detection pipe 3143, and is electrically connected to the first electron magnetic valve 50 and configured to detect air pressure in the expansion space 31*a* and control the first electron magnetic valve 50 for air exhaust.

It should be noted that the detection node of the first air pressure sensor 60 is arranged in the expansion space 31*a*. When the air injected into the expansion space 31*a* reaches a certain level, the first air pressure sensor 60 detects that the air pressure in the expansion space 31*a* reaches a threshold, the first electron magnetic valve 50 is controlled to open, and the first electron magnetic valve 50 controls the air outlet pipe 3142 to open, so as to discharge the air in the expansion space 31*a* into the silicone sleeve 13. Or after the user uses the massager, the first electron magnetic valve 50 is driven to operate so as to control the air exhaust pipe to communicate, thus discharging the air.

Further, when the user needs to increase the volume to satisfy her demands, the air pump 40 is controlled to operate, such that the air exported by the air pump 40 enters the expansion space 31*a* through the air inlet pipe 3141, so as to enlarge the expansion space 31*a*, thus increasing the volume of the massager 100.

To inflate or deflate the silicone sleeve 13, in a specific embodiment, the massager 100 further includes a second air pressure sensor and a second electron magnetic valve 70. The second air pressure sensor is disposed in the inner cavity of the first body 11 and/or the second body 12, electrically connected to the second electron magnetic valve 70, and configured to detect air pressure of an inner cavity of the silicone sleeve 13. The second electron magnetic valve 70 is disposed in the first body 11 and extends out of the first body 11 and the silicone sleeve 13 to communicate with the outside for air intake or exhaust.

It should be noted that when it is necessary to increase the volume of the massager 100, the second electron magnetic valve 70 is controlled first to draw outdoor air into the silicone sleeve 13, and when the silicone sleeve 13 is full of air, the air in the silicone sleeve 13 is guided by the air pump 40 into the expansion space 31*a* through the air inlet pipe 3141.

Further, when the air in the expansion space 31*a* is full and needs to be discharged, the first electron magnetic valve 50 is used for discharging air in the expansion space 31*a* through the air outlet pipe 3142 into the silicone sleeve 13, and when the second air pressure sensor detects that the air pressure in the silicone sleeve 13 reaches the threshold, the second electron magnetic valve 70 is controlled to start, so as to discharge the air in the silicone sleeve 13.

To ensure the air tightness of the expansion space 31*a*, in a specific embodiment, the first sealing portion 312 and the second sealing portion 313 wrap the outer wall of the expansion member 32. Specifically, the first sealing portion 312 and the second sealing portion 313 are provided with protrusions outward, and the protrusions squeeze and fit with the outer wall of the expansion member 32, so as to block openings at two ends of the expansion member 32, thus achieving air tightness.

The foregoing are merely implementations of this application. It should be noted that improvements can be made by those of ordinary skill in the art without departing from the concept of this application, and these improvements should fall within the protection scope of this application.

What is claimed is:

1. A massager, comprising:

a shell, comprising a first body, a second body, and a silicone sleeve, wherein the first body and the second body are inserted along a length direction of the shell, and the silicone sleeve sleeves the first body and the second body;

a jacking assembly having one end fixed in an inner cavity of the first body and the other end fixed in an inner cavity of the second body and configured to extend and retract to drive the second body to move relative to the first body along the length direction of the shell;

an expansion assembly sleeved between the second body and the silicone sleeve and configured to expand so as to enlarge a diameter of the silicone sleeve outside the second body;

the second body comprises a first abutting portion, a sliding portion, and a second abutting portion that are sequentially connected;

the first body is provided with a first inner cavity and a first opening in communication with the first inner cavity;

the first abutting portion is provided with a fixing hole, the connector is fixed in the fixing hole, part of the sliding portion protrudes into the first opening, and the second abutting portion is disposed at an end of the sliding portion away from the first abutting portion; and wherein a cross-sectional area of the first abutting portion is greater than a cross-sectional area of the first opening, a cross-sectional area of the second abutting portion is greater than the cross-sectional area of the first opening, and a cross-sectional area of the sliding portion is less than or equal to the cross-sectional area of the first opening.

2. The massager according to claim 1, wherein the jacking assembly comprises a telescopic motor and a connector; wherein the telescopic motor is fixed in the inner cavity of the first body and the connector has one end fixed in the inner cavity of the second body and the other end fixed on a drive shaft of the telescopic motor.

3. The massager according to claim 1, wherein the connector comprises a first connecting portion and a second connecting portion that are connected sequentially; and the first connecting portion is fixed in the fixing hole, and the second connecting portion protrudes into and is fixed in an inner cavity of the sliding portion.

4. The massager according to claim 1, wherein the second body further comprises a support portion disposed on the second abutting portion, and the support portion is provided with an accommodating groove provided in its outer peripheral wall; and the expansion assembly comprises a fixing member and an expansion member, the fixing member is sleeved in the accommodating groove, and the expansion member sleeves the fixing member and is configured to expand, when the massager protrudes into a human body, to increase a diameter of the silicone sleeve at the second body.

5. The massager according to claim 4, wherein the fixing member comprises a main body portion, a first sealing portion, a second sealing portion, and an air guide portion;

the main body portion is provided with a through groove along its length direction, and the support portion is inserted into the through groove;

the first sealing portion and the second sealing portion are respectively disposed at two ends of the main body portion, the expansion member surrounds the main body portion and has two ends sealingly abutting against the first sealing portion and the second sealing portion, respectively, and the expansion member, the main body portion, the first sealing portion, and the second sealing portion enclose an expansion space; and the main body portion is provided with an air inlet in communication with the through groove and the expansion space, and the air guide portion is disposed at the through groove and communicates with the air inlet.

6. The massager according to claim 5, wherein the air guide portion comprises an air inlet pipe, an air outlet pipe, and an air pressure detection pipe that are in communication with the expansion space, and the massager further comprises an air pump, a first electron magnetic valve, and a first air pressure sensor;

the air pump is disposed in an inner cavity of the support portion, communicates with the air inlet pipe, and is configured to inflate the expansion space via the air inlet pipe and the air inlet;

the first electron magnetic valve is disposed in the inner cavity of the support portion, communicates with the air outlet pipe, and is configured to control the air outlet pipe for air exhaust; and the first air pressure sensor is disposed on the support portion, communicates with the air pressure detection pipe, and is electrically connected to the first electron magnetic valve and configured to detect air pressure in the expansion space and control the first electron magnetic valve for air exhaust.

7. The massager according to claim 6, wherein the massager further comprises a second air pressure sensor and a second electron magnetic valve;

the second air pressure sensor is disposed in the inner cavity of the first body and/or the second body, electrically connected to the second electron magnetic valve, and configured to detect air pressure of an inner cavity of the silicone sleeve; and the second electron magnetic valve is disposed in the first body and extends out of the first body and the silicone sleeve to communicate with the outside for air intake or exhaust.

8. The massager according to claim 5, wherein the first sealing portion and the second sealing portion wrap an outer wall of the expansion member.

9. A massager, comprising:

a shell, comprising a first body, a second body, and a silicone sleeve, wherein the first body and the second body are inserted along a length direction of the shell, and the silicone sleeve sleeves the first body and the second body;

a jacking assembly having one end fixed in an inner cavity of the first body and the other end fixed in an inner cavity of the second body and configured to extend and retract to drive the second body to move relative to the first body along the length direction of the shell;

an expansion assembly sleeved between the second body and the silicone sleeve and configured to expand so as to enlarge a diameter of the silicone sleeve outside the second body;

the second body comprises a first abutting portion, a sliding portion, and a second abutting portion that are sequentially connected;

the first body is provided with a first inner cavity and a first opening in communication with the first inner cavity;

the first abutting portion is provided with a fixing hole, the connector is fixed in the fixing hole, part of the sliding portion protrudes into the first opening, and the second abutting portion is disposed at an end of the sliding portion away from the first abutting portion;

wherein the second body further comprises a support portion disposed on the second abutting portion, and the support portion is provided with an accommodating groove provided in its outer peripheral wall; and the expansion assembly comprises a fixing member and an expansion member, the fixing member is sleeved in the accommodating groove, and the expansion member sleeves the fixing member and is configured to expand, when the massager protrudes into a human body, to increase a diameter of the silicone sleeve at the second body.

10. The massager according to claim 9, wherein the jacking assembly comprises a telescopic motor and a connector; wherein the telescopic motor is fixed in the inner cavity of the first body and the connector has one end fixed in the inner cavity of the second body and the other end fixed on a drive shaft of the telescopic motor.

11. The massager according to claim 9, wherein the connector comprises a first connecting portion and a second connecting portion that are connected sequentially; and the first connecting portion is fixed in the fixing hole, and the second connecting portion protrudes into and is fixed in an inner cavity of the sliding portion.

12. The massager according to claim 9, wherein the fixing member comprises a main body portion, a first sealing portion, a second sealing portion, and an air guide portion;

the main body portion is provided with a through groove along its length direction, and the support portion is inserted into the through groove;

the first sealing portion and the second sealing portion are respectively disposed at two ends of the main body portion, the expansion member surrounds the main body portion and has two ends sealingly abutting against the first sealing portion and the second sealing portion, respectively, and the expansion member, the main body portion, the first sealing portion, and the second sealing portion enclose an expansion space; and the main body portion is provided with an air inlet in communication with the through groove and the expansion space, and the air guide portion is disposed at the through groove and communicates with the air inlet.

13. The massager according to claim 12, wherein the air guide portion comprises an air inlet pipe, an air outlet pipe, and an air pressure detection pipe that are in communication with the expansion space, and the massager further comprises an air pump, a first electron magnetic valve, and a first air pressure sensor;

the air pump is disposed in an inner cavity of the support portion, communicates with the air inlet pipe, and is configured to inflate the expansion space via the air inlet pipe and the air inlet;

the first electron magnetic valve is disposed in the inner cavity of the support portion, communicates with the air outlet pipe, and is configured to control the air outlet pipe for air exhaust; and the first air pressure sensor is disposed on the support portion, communicates with the air pressure detection pipe, and is electrically connected to the first electron magnetic valve and configured to detect air pressure in the expansion space and control the first electron magnetic valve for air exhaust.

14. The massager according to claim 13, wherein the massager further comprises a second air pressure sensor and a second electron magnetic valve;

the second air pressure sensor is disposed in the inner cavity of the first body and/or the second body, electrically connected to the second electron magnetic valve, and configured to detect air pressure of an inner cavity of the silicone sleeve; and the second electron magnetic valve is disposed in the first body and extends out of the first body and the silicone sleeve to communicate with the outside for air intake or exhaust.

15. The massager according to claim 12, wherein the first sealing portion and the second sealing portion wrap an outer wall of the expansion member.

* * * * *